O. BENNETT.
TELEGRAPHIC TYPE WRITER.
APPLICATION FILED MAY 4, 1916.
1,312,775.
Patented Aug. 12, 1919.
7 SHEETS—SHEET 1.
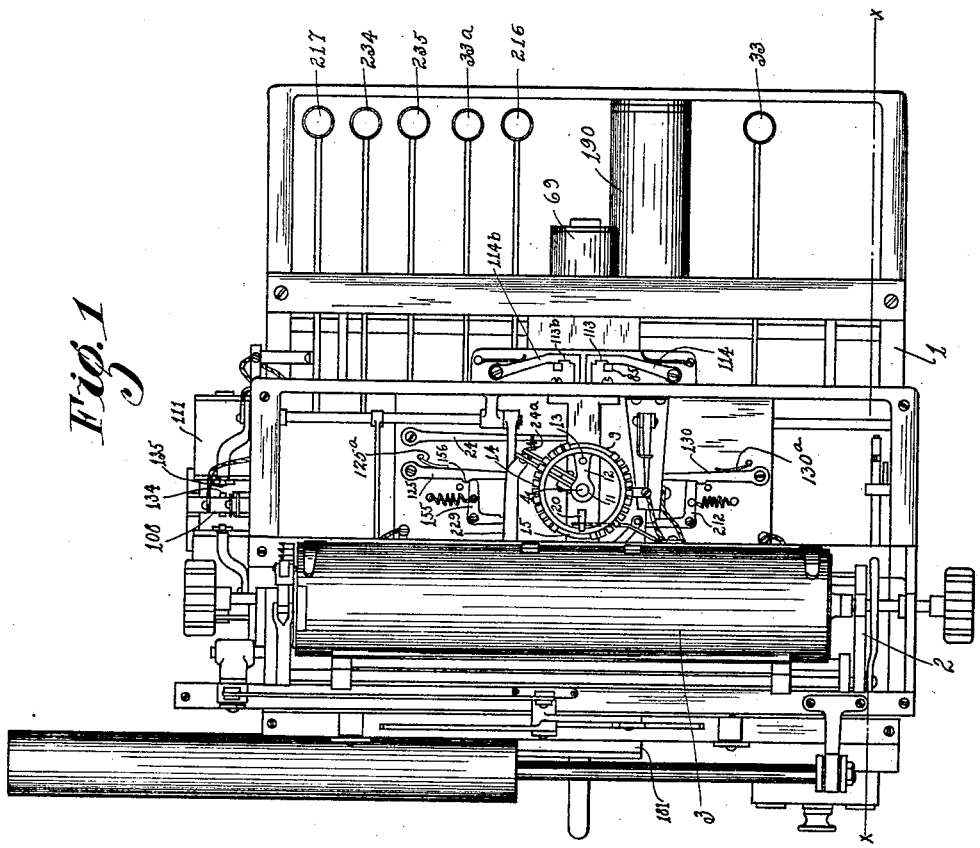
WITNESS.
INVENTOR.
Orin Bennett
BY
ATTORNEY.

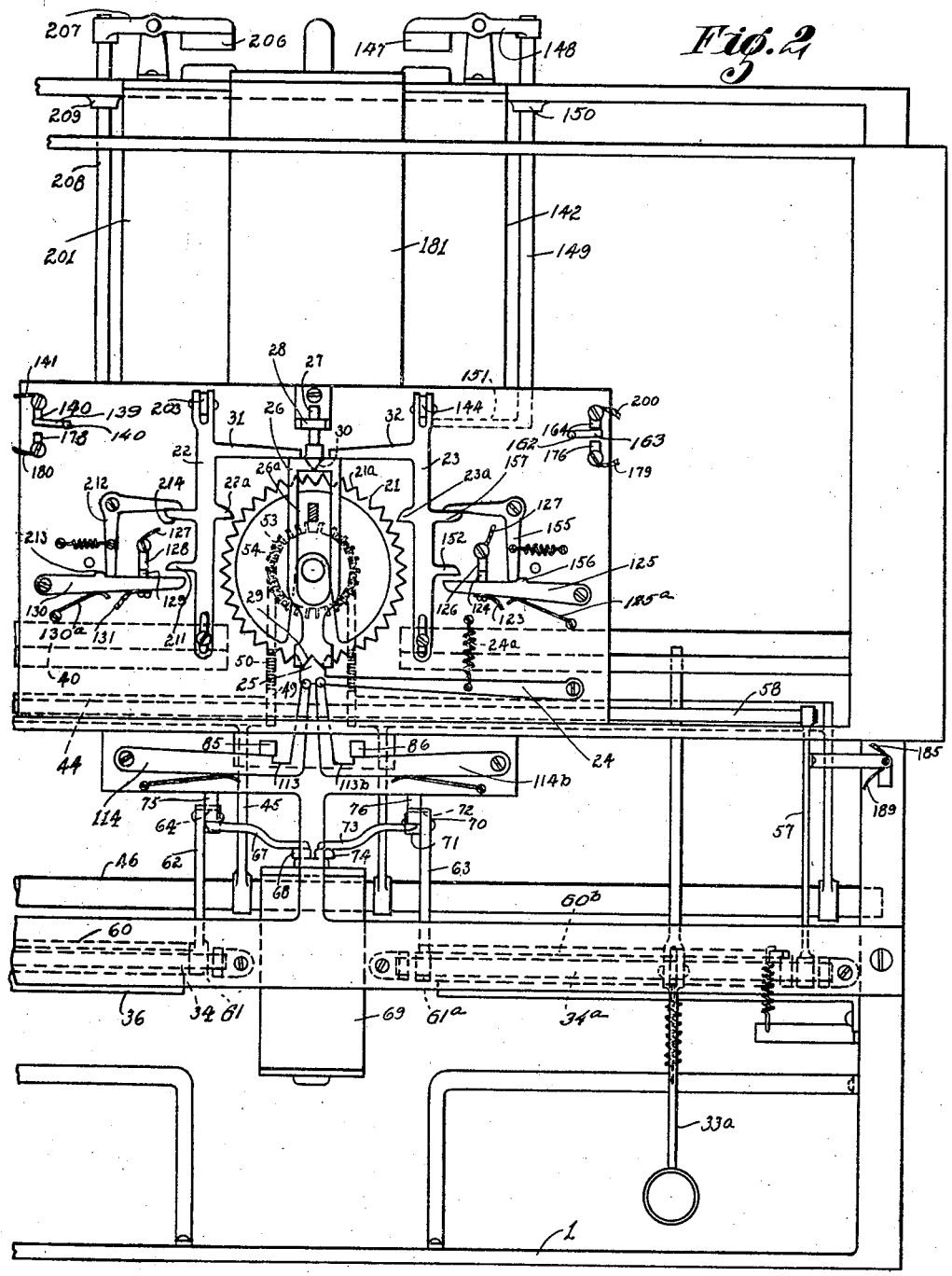

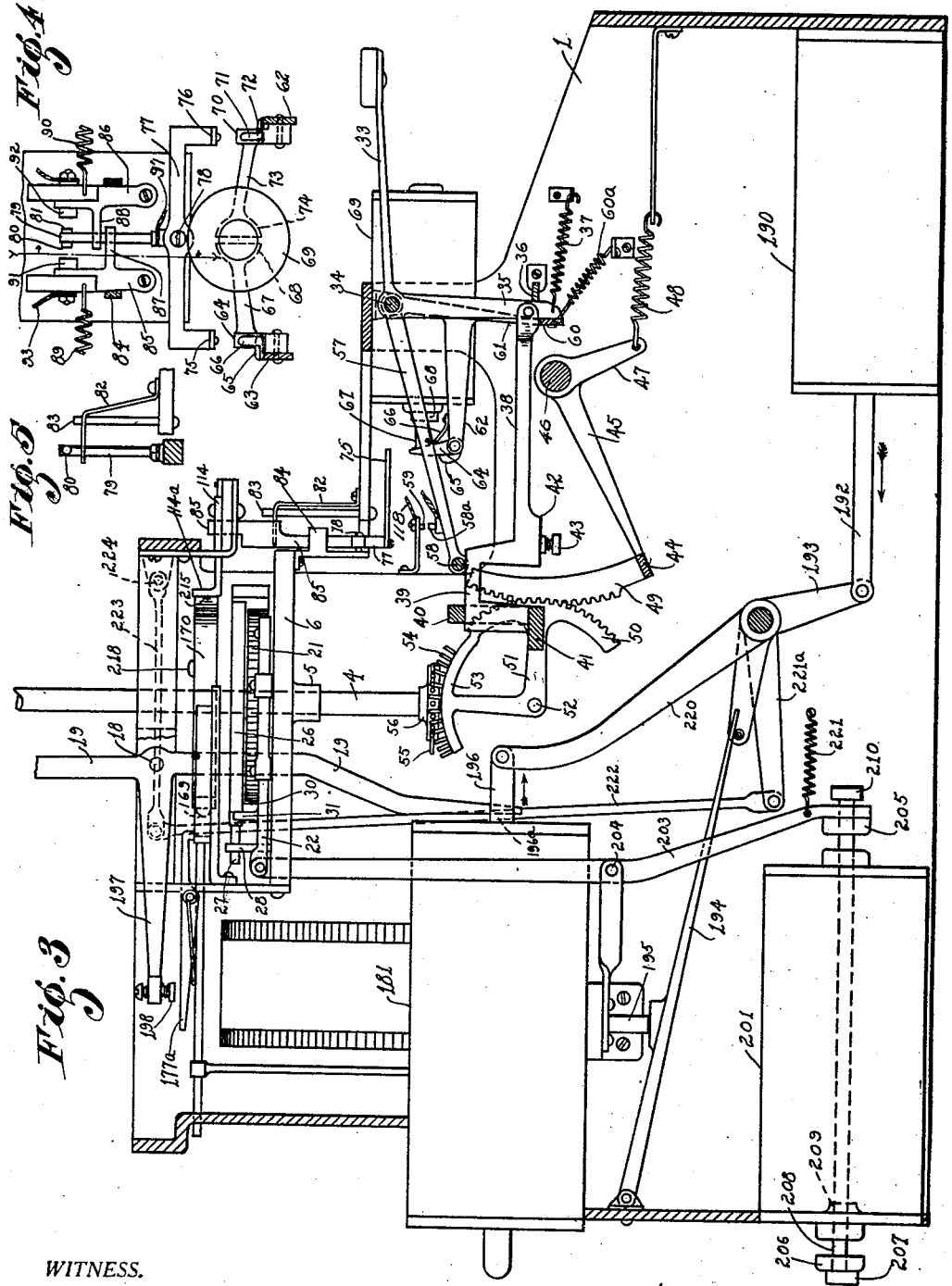

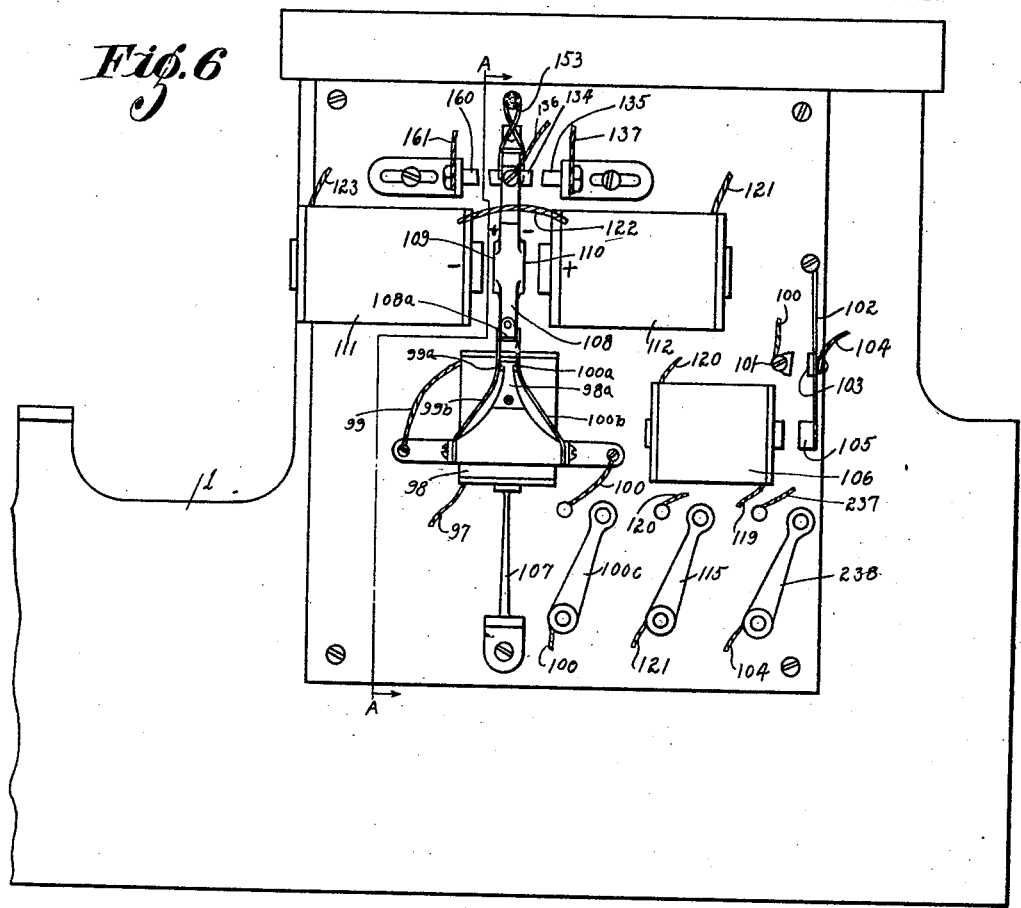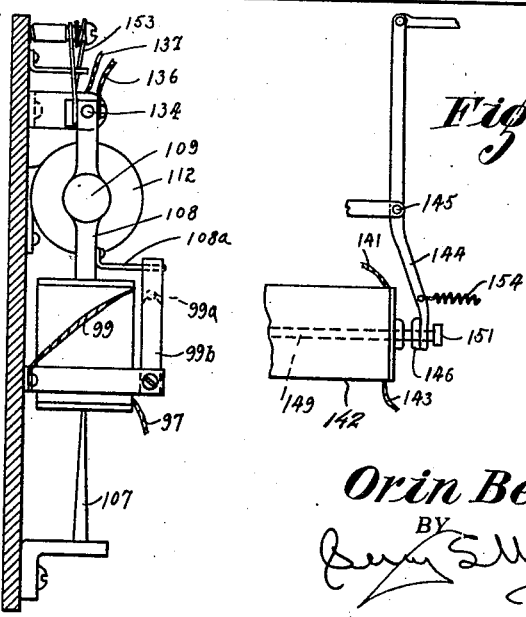

O. BENNETT.
TELEGRAPHIC TYPE WRITER.
APPLICATION FILED MAY 4, 1916.

1,312,775.

Patented Aug. 12, 1919.
7 SHEETS—SHEET 5.

WITNESS.

Floyd M. Blanchard

INVENTOR.
Orin Bennett
BY
ATTORNEY.

O. BENNETT.
TELEGRAPHIC TYPE WRITER.
APPLICATION FILED MAY 4, 1916.

1,312,775.

Patented Aug. 12, 1919.
7 SHEETS—SHEET 6.

WITNESS.

Floyd M. Blanchard

INVENTOR,
Orin Bennett
BY
ATTORNEY.

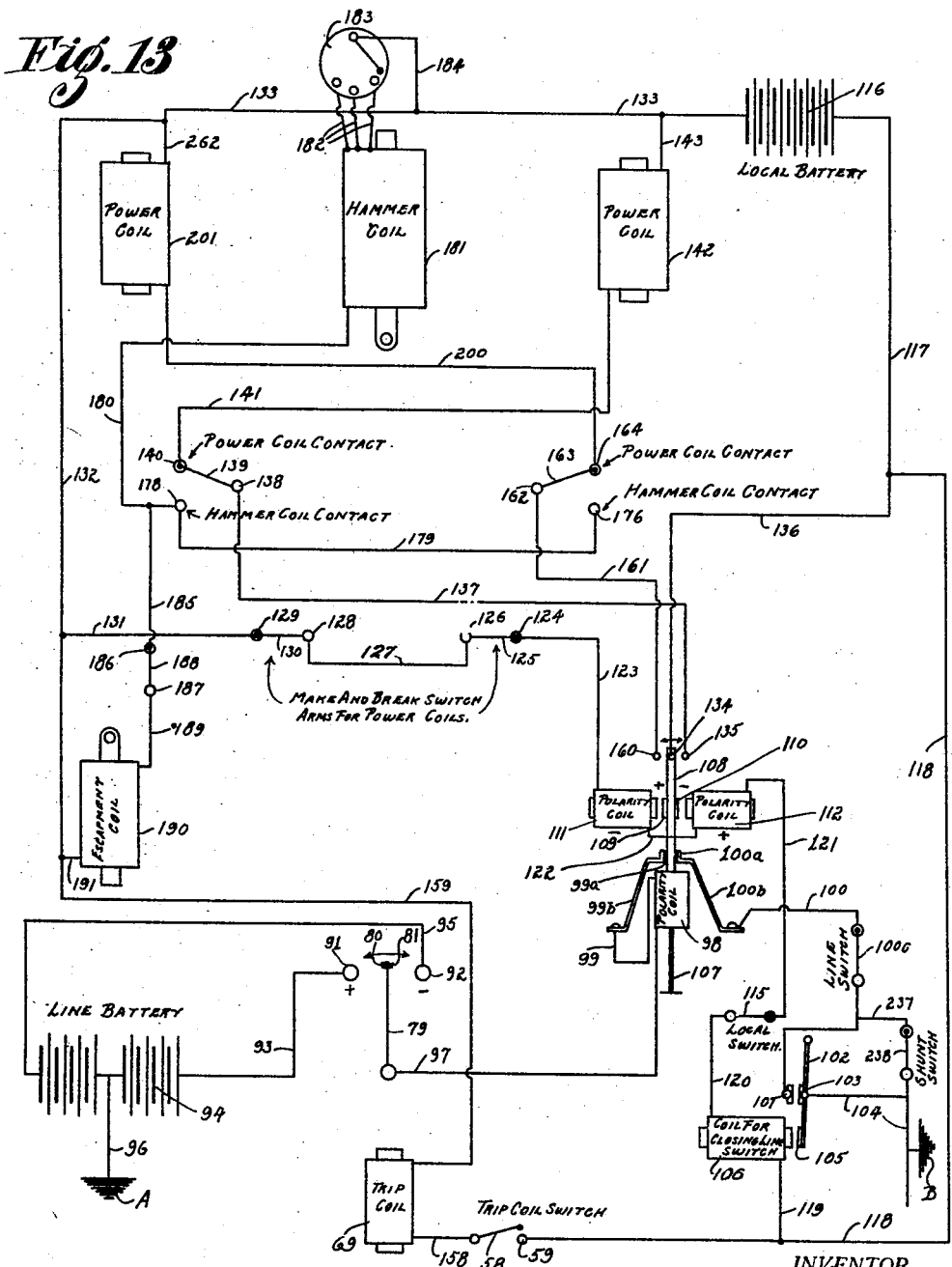

UNITED STATES PATENT OFFICE.

ORIN BENNETT, OF PLACERVILLE, CALIFORNIA, ASSIGNOR TO PACIFIC COAST TYPE-WRITER COMPANY, OF PLACERVILLE, CALIFORNIA, A CORPORATION.

TELEGRAPHIC TYPE-WRITER.

1,312,775.   Specification of Letters Patent.   Patented Aug. 12, 1919.

Application filed May 4, 1916. Serial No. 95,329.

*To all whom it may concern:*

Be it known that I, ORIN BENNETT, a citizen of the United States, residing at Placerville, in the county of Eldorado, State of California, have invented certain new and useful Improvements in Telegraphic Type-Writers; and I do declare the following to be a full, clear, and exact description of the same, reference being had to the accompanying drawings, and to the characters of reference marked thereon, which form a part of this application.

This invention relates to improvements in the method and mechanism for the transmission of messages by telegraphic means, the object of the invention being primarily to provide a typewriter whereby the message sent will be automatically typewritten upon the sending machine and will likewise be automatically received and typewritten upon the receiving machine or any number of receiving machines arranged in series.

My primary aim in designing the present disclosed invention is to provide a sending and receiving machine identical with each other and so constructed and connected that the action of each is interdependent upon the other making both the sending and receiving of messages absolutely positive, namely, if the sending machine or receiving machine should become incapacitated for any reason it will stop the action of both machines so that there will be no possibility of error in the transmission of messages.

In conjunction with the positive action of the machines as indicated above, and as a direct result of such positive action, my machine is so designed that every movement and action of the same is imparted or impelled by a forced motion directly interdependent upon the action or movement of other parts; that is, if one part of the machine is operative it forces all the other operative parts to move successively to perform the functions for which the machine is designed; or if one part becomes inoperative it renders inoperative all the other parts as each is absolutely dependent upon the other and the movement and action of each is forced by the others.

The printing action of the machine with all the interdependent operative structures, such as the placing of the type, the spacing, the escapement, the return, and the advancement of the sheet upon which the writing is being impressed are all controlled electrically and it is these several movements which are impelled one by the other in successive order, the type keys being merely used to indicate the matter to be written and to start the mechanism into action, and once started the entire cycle of action of the machine will take place both in the sending and receiving machines and nothing can stop the same save a breaking of the electrical circuit either designedly or by reason of accident.

The machine will be so designed and constructed that when once assembled and connected there is no reason why any of the relative parts should become inoperative except by reason of their wearing out which should not occur for a term of years.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Figure 1 is a top plan view of the machine showing but one each of the necessary operating keys, all the other letter keys being duplicates of the one shown, the showing of which would only make a multiplicity and confusion of lines in the drawings, hence they have been omitted.

Fig. 2 is a top plan view showing the type rack, platen and other ordinary mechanism removed in order to expose the make and break mechanism by means of which the type rack is turned to proper position for striking the desired type against the platen.

Fig. 3 is a sectional view taken on a line X—X of Fig. 1.

Fig. 4 is a detached front elevation of the current reversing mechanism which controls the relative movements of the type rack as well as other mechanism as will appear.

Fig. 5 is a sectional view taken on a line Y—Y of Fig. 4.

Fig. 6 is a front elevation of the switch board showing the line current and polarity control mechanism of the device.

Fig. 7 is a sectional view taken on a line A—A of Fig. 6.

Fig. 13 is a diagrammatic view of the electrical circuits used in controlling the operation of my improved device. Fig. 14 is a fragmentary view showing the power coil and lever connection.

Referring now more particularly to the characters of reference on the drawings, the numeral 1 designates the frame of the device which may be of any desired structure.

Mounted in this frame is the usual carriage 2 carrying a platen 3 all of which is constructed substantially the same as in the now commonly used typewriting machines.

Figure 11:
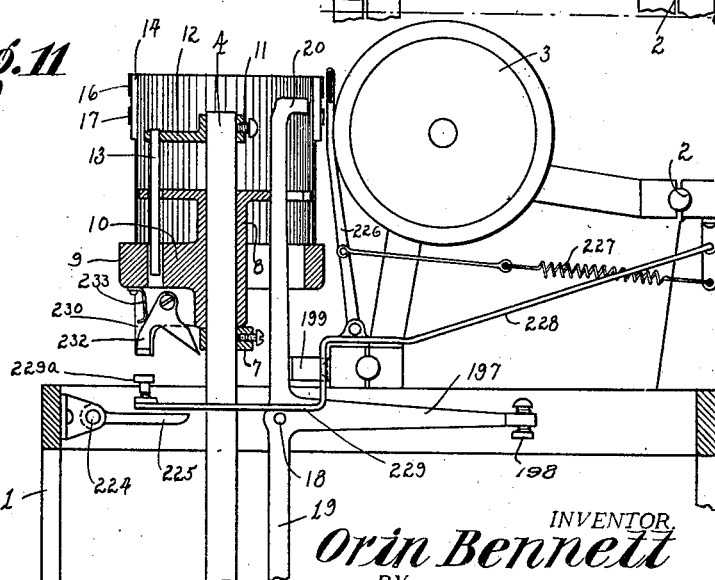
Fig. 11 is a sectional view taken on a line C—C of Fig. 10.

Disposed substantially centrally of the machine (see Figs. 1, 3 and 11) is a vertical shaft 4 suitably journaled in a bearing 5 on a supporting frame 6, such shaft 4 extending adjacent the front of the platen 3 and being provided with a collar 7 resting on which is a sleeve 8 of the type rack 9, the type rack 9 being connected with the sleeve 8 by means of suitable arms 10.

Keyed or otherwise secured to the top of the shaft 4 is a collar 11 having a projecting arm 12 on which is a vertical pin 13 extending through the arms 10. The sleeve 8 is normally slidable vertically on the shaft 4 and is likewise made turnable with such shaft 4 by means of the connections 11, 12 and 13 as will be readily apparent without further explanation.

The type rack 9 carries vertical type bars 14, half on one side and half on the other, with an intervening space 15 equal in width to the width of four of the type bars 14. These type bars 14 carry small letter type 16 in one row and capital letter type and figures 17 in another row, the row 17 being drawn into proper alinement with the platen 3 by means of moving the sleeve 8 on the shaft 4 in a manner as will hereinafter fully appear.

Pivoted at any suitable point, as at 18, is a hammer lever 19 having a hammer 20 projecting within the type bars at a point adjacent the platen 3 so that this hammer 20 may strike against any one of the type bars brought adjacent the same to cause the impression of the type against the paper held around the said platen 3. The operation of this hammer will be brought out in detail hereafter.

The bringing of these type bars adjacent the hammer is accomplished by means of mechanical structure electrically operated. Describing first the mechanical structure itself (see Figs. 2 and 3), the numeral 21 designates a ratchet wheel, the width of the ratchets on this wheel 21 corresponding with the width of the type bars 14; that is, when the ratchet wheel 21 is moved a distance equal to the width of one ratchet it will move the type rack a distance equal to the width of one type bar. While these relative sizes may be varied in different sized machines it will be necessary to properly describe the present disclosed structure that I give exact measurements and for that purpose I have shown the ratchets 21a on the wheel 21 as one-eighth of an inch from center to center.

Slidably guided on each side of the ratchet wheel 21 are what I will term impulse bars 22 and 23. On the bar 22 is an operating cam 22a and on the bar 23 is a similar operating cam 23a. These cams 22a and 23a are arranged to engage the ratchet wheel 21 to move it in one direction or the other. They extend normally about one thirty-second of an inch from the teeth which they would engage. The bars 22 and 23 are arranged to have a movement of one-eighth of an inch.

Assuming now that the bar 22 is given a power impulse to slide it so as to bring the cam 22a into engagement with one of the ratchet teeth 21a, this cam will first move one thirty-second of an inch, will then engage the teeth and move three thirty-seconds of an inch.

The numeral 24 (see Figs. 1 and 2) designates a spring pulled lever having a V-shaped retaining member 25 on its end which normally engages the ratchet rack 21 to hold it in positive position. Slidable above the ratchet wheel 21 is a bar 26 having a slot 26a to allow it to move relative to the shaft 4. Such bar 26 is provided with a projecting pin 27 guided through an orificed guide 28, the opposite end of the bar 26 being V-shaped, as at 29, to normally engage the retaining member 25. Carried by the bar 26 is another V-shaped retaining member 30 (see Figs. 2 and 3) which, when the bar 26 is moved so as to press the retaining member 25 out of engagement with the ratchet wheel 21, will bring the member 30 into engagement with said ratchet wheel, this being for the purpose of maintaining the action of the ratchet wheel 21 positive and also to prevent vibration thereof with rapid movement, all for the purpose and in a manner as will presently appear.

On the bars 22 and 23 are projecting arms 31 and 32 respectively, each engaging the end of the bar 26.

Referring back now to the cam 22a and the turning of the ratchet wheel 21 three thirty-seconds of an inch, this action has caused the arm 31 to move the bar 26 so as to disengage the retaining member 25 from the ratchet wheel and bring the retaining member 30 immediately adjacent the ratchet wheel so as to hold the same rigid and prevent vibration thereof. Likewise the tooth of the ratchet wheel next succeeding the tooth from which the retaining member 25 is removed is brought just past the center line of the retaining member 25. Since the width of one of the type bars is one-eighth of an inch and since by the motion just described the ratchet wheel 21 has been moved three thirty-seconds of an inch, and in order to properly position the said type bars, it is necessary that the ratchet wheel and incidentally the shaft 4 be moved another one thirty-second of an inch and this is accomplished as follows, namely:

With the return movement of the bar 22 the arm 31 is moved away from the bar 26. The action of the spring 24a pulling on the lever 24 then forces the retaining member 25 to push the bar 26 back to normal position which will release the retaining member 30 from engagement with the ratchet wheel 21. This action of the lever 24 will likewise cause the retaining member 25 to engage the side of the adjacent ratchet of such ratchet wheel 21 and move it until said retaining member 25 fits snugly into the V-shape of the ratchet. This movement will be substantially one thirty second of an inch so that the necessary turning of the ratchet wheel 21 and the shaft 4 will be accomplished for the purposes noted.

This action of the retaining members is designed so that when the ratchet wheel is pulled under the influence of the electrical force there will be no sudden jar brought to bear against the same but the movement will be so regulated and controlled that when the movement is completed it will be so completed by the mechanical means of the retaining member 25 acting against the V-shaped ratchets which will be an easy cushion movement rather than an abrupt stop as would be the case if the same was completely moved by the electrical action hereinafter described.

For moving the ratchet wheel in the reverse direction the bar 23 would be operated with exactly the same procedure as that just described for the bar 22, only moving the ratchet wheel 21 in the reverse direction to that occasioned by the movement of the bar 22. These bars 22 and 23 are moved by electrically controlled means operable from the key structure, which is divided into two identical units, one on each side of the center of the machine.

In now describing the key structure, I will merely describe the structure of one key it being thoroughly understood that all the others used on the machine will be identical with the exception of the adjustment means for limiting the movement as will presently appear.

This key structure (see Fig. 3) comprises the key lever 33 pivoted on a shaft 34 and having a downwardly projecting arm 35 normally held against the stop bar 36 by a spring 37. Pivoted on the lower end of the arm 35 is a projecting bar 38 having on its outer end a finger member 39 guided in a slotted guide bar 40 having a bottom bar 41 limiting the downward movement of the finger member 39, said slotted guide member 40 being arranged to keep the respective finger members and bars 38 spaced laterally and prevent their having lateral vibration.

On the outer end of each of the bars 38 is a cam surface 42 screwed into which is a set screw 43. The set screws 43 on different keys will be set in different relatively vertical positions in order to control and limit the vertical movement of a bar 44 suspended in arms 45 fixed to a cross shaft 46 secured to which shaft is a projecting arm 47 having a pulling spring 48 connected therewith, the action of which spring will pull on the arm 47 to push the shaft 46 normally to that position which will hold the arms 45 and incidentally the cross bar 44 in their lowest position.

Projecting upwardly from the bar 44 is a gear quadrant 49 engageable with another gear quadrant 50 having an arm 51 turnable on a shaft 52. Connected with the quadrant 50 is a pin tooth quadrant 53 the pin teeth 54 of which engage the pin teeth 55 on a wheel 56 fixed to the lower end of the shaft 4. The purpose of this latter described structure will be readily apparent as this description proceeds.

Swinging on the shaft 34 are projecting arms 57 carrying in their outer ends a cross rod 58 normally extending within the path of the finger members 39. On one of the arms 57 is an electrical contact point 58 alined and arranged to be brought into contact with another point 59 fixed to the frame 1 at any suitable point, the purpose of these contact points being brought out later.

The arms 35 of the keys on one side of the center of the machine normally engage cross bars 60 suspended on arms 61 turnable on the shaft 34. Those arms on the other side of the center of the machine engage a similar bar 60b swung on arms 61a from the shaft 34a corresponding to the shaft 34, (see Figs.

2, 3 and 4). As before indicated, the key structure on both sides of the center line of the machine is identical, except that through the medium of the arms 62 and 63 (mentioned next below) the type rack is moved to the right or to the left to bring the proper type to position for printing. On the arm 61 closest the center of the machine is a finger member 62 and on the corresponding arm 61a is a finger member 63. Projecting from the dog 64 is an arm 67 having a plate 68 normally extending in the path of an electromagnet 69. Similarly the finger member 63 is provided with a dog 70 held by a spring 71 normally against the stop member 72, such dog 70 having a projecting arm 73 provided with a plate 74 projecting in the path of the electromagnet 69. The dog 64 projects directly beneath a small bar 75 and the dog 70 extends directly underneath a similar bar 76. The bars 75 and 76 project from opposite ends of a rocking frame 77 pivoted centrally, as at 78. Projecting upwardly and insulated from the rocking frame 77 is a contact pin 79 having two opposite contact points 80 and 81.

The pin 79 is held in a normal vertical position, and the frame 77 horizontally, by means of springs 82 (see Figs. 3 and 5) one of such springs bearing against each side of such pin 79. The true vertical position of such pin 79 is made positive by means of a rigid centering pin 83, which limits the action of the springs 82 toward the normal vertical center of such pin 79. These springs 82 will at all times return such pin 79 and incidentally the frame 77 to normal position when released from the holding mechanism hereinafter described.

Movable in a guide 84 are two rocking arms 85 and 86 respectively, one on each side of the pin 79 such rocking arms having projecting hooks 87 and 88 respectively arranged to be engaged by the pin 79 as it moves in one direction or the other. The normal position of the arms 85 and 86 spaced on each side of the pin 79 is maintained by springs 89 and 90 respectively. On the arm 85 is a contact point 91 and on the arm 86 is a contact point 92 alined and arranged for contact with the points 80 and 81 respectively. These points 91 and 92 are of course insulated from the arms 85 and 86. Likewise the points 80 and 81 are insulated from the pin 76. This prevents the shorting of the circuit when the mechanism is in operation.

From the point 91 a wire 93 leads to a positive pole of the line battery 94 (see Fig. 13). This line battery is the one which provides the energy for carrying the electrical impulses from the sending to the receiving machine and is to be distinguished from the local battery for operating the individual machines and the fact that there are two different batteries must be borne in mind throughout the specification.

From the point 92 a wire 95 leads to the negative side of the line battery 94 and a ground wire 96 leads to a point between a positive and negative pole of this battery 94 in order to allow of the reversing of the current through the battery for a purpose as will presently appear.

A wire 97 leads from the pin 79 and extends to one end of the winding of what I will call the polarity coil 98 (see Figs. 6, 7 and 13). A wire 99 leads from the other end of the winding of the coil 98 thence to a spring leg 99b having a contact point 99a. Spaced from the point 99a is a similar point 100a likewise mounted on a spring leg 100a. A wire 100 leads from the leg 100b through a line switch 100c thence to a contact point 101.

Mounted on the spring bar 102 is another contact point 103 arranged for contact with the point 101 and leading from which is a wire 104 which goes out over the line for carrying the electrical impulses from one machine to the other. On the member 102 is a plate 105 arranged in the path of an electromagnet 106.

The polarity coil 98 is mounted on a vibrant bar 107 to allow of its swinging in either direction and its core 108 is extended as shown and provided with two plates 109 and 110 movable between two electromagnets 111 and 112 respectively. Also on the core 108 is a projecting lip 108a which normally projects between the extended ends of the legs 99b and 100b and makes a connection between them, the said legs 99b and 100b being normally held centered by means of an insulated connecting block 98a.

In describing the operation of the machine I will only describe its effect upon the one machine illustrated in the drawings which, for the purpose of the illustration, will be considered as the sending machine. The operation of the sending machine will simultaneously operate the receiving machine in the same manner (with the exception that the keys of the receiving machine will not be operated) hence it will be unnecessary to make a duplicate description, simply bearing in mind the fact that the line current which controls the local currents will control the local currents of both the sending and receiving machines in identically the same manner.

Describing now the initial method of starting the mechanism of the machines into action, the operator presses down the key 33 (see Figs. 1, 3 and 5). This swings the key 33 which for the purpose of the illustration we will consider to be a key on the left hand side of the center of the machine. The action of this key 33 on its pivot 34 will cause the arm 35 to move against the pulled spring bar 60 causing the arm 61 and extended finger member 62 to describe an arc, which movement will bring the dog 64 into engagement with the arm 75. This action will rock the frame 77 on its pivotal point 78 and so move the pin 79 as to bring the contact point 81 into engagement with the contact point 92.

With this movement of the pin 79 it engages the hook 87 and moves the arm 85 in the same direction as the pin 79 moves until the upper end of said arm 85 engages a notch 113 in a spring pressed lever 114 which will hold the said arm 85 in that position until released in a manner hereinafter described and all for a purpose as will appear.

When the contact points 81 and 92 come together a circuit is then completed as follows, namely:

From the battery 94 through the wire 96 and into the ground at the point A thence through the machine which may be connected with the sending machine and back into the sending machine at the point B, thence through the wire 104, contact point 103, (which is held in conjunction with the point 101 as will appear hereinafter) thence through said point 101, wire 100, leg 100b points 100a and 99a thence through leg 99b, wire 99, coil 98, wire 97, pin 79, point 81, point 92, wire 95 and thence to the battery 94. This action causes the polarity coil 98 to be brought into action and to polarize its core 108 and incidentally the plates 109 and 110 with a negative polarity.

It will be well at this time to state that when the machine is to be operated a local circuit is first completed for closing the switch 115 (see Figs. 6 and 13) which completes a circuit from the local battery 116 through a wire 117, a wire 118, wire 119, the coil 106, a wire 120, switch 115, wire 121, coil 112, wire 122, the coil 111, a wire 123, a contact point 124 (see Figs. 1 and 2) on a switch arm 125, acting under the influence of a spring 125a, a fixed contact point 126, wire 127 to another fixed contact point 128 thence to a contact 129 on another switch arm 130, acting under the influence of a spring 130a, thence through a wire 131, wire 132, wire 133 to the battery 116.

From the above description of the circuit it will be noted that the coil 112 will be at all times of a positive polarity and hence when the contact point 110 is given a negative polarity it will be attracted by the coil 112. This action will swing the core 108 extending from the coil 98 on the vibrant bar 107 and bring the contact point 134 on the core 108 into contact with a contact point 135. The contact point 134 is wired to the wire 117 by means of a wire 136 hence when the points 134 and 135 are brought together a circuit will be completed (see Figs. 2, 6, 8, 13 and 14) from the battery 116 through the wire 117, wire 136, point 134, point 135, wire 137, point 138 on a switch arm 139 thence through a fixed point 140, wire 141 into an electromagnetic power coil 142, wire 143, wire 133 to the battery 115.

This current then causes the power coil 142 to operate which causes the following mechanism to be thrown into action, to-wit:

A lever 144 is suitably pivoted relative to the frame of the machine, as at 145, and is provided with a plate 146 disposed within the path of and arranged to be influenced by the electromagnet 142. This is influenced from both ends of the coil as follows, namely (see Figs. 2 and 14):

The front end of the coil 142 directly attracts the plate 146 and the rear end attracts a plate 147 on a small lever 148 connected by a rod 149 slidable through a guide 150 and having on its opposite end a finger member 151 arranged to strike against the end of the lever 144. This structure is so arranged that when the coil 142 is brought into action both ends will act. The complete movement between the plate 146 and the core of the coil 142 is to be one-eighth of an inch, the action of the rod 149 will be such that it will push the finger member 151 against the lever 144 for about one-sixteenth of an inch, the balance of the movement being then completed by the front end of the coil 142 alone. The object of this is that when the coil 142 is first brought into action to act on the lever 144 it will have its maximum load and lowest power but by giving the lever 144 a lift from the other end this compensates for this inequality between the load and power. This maximum load and the reasons therefor will appear as this specification is proceeded with.

When the lever 144 is actuated by the coil 142 it pushes against the bar 23 which causes the cam 23a to engage one of the ratchet wheels 21 and move the type rack in the manner already described. This movement of the type rack is made in single impulses, each impulse turning the rack the width of one type bar and with each complete movement there would be as many impulses as is necessary to turn the rack a number of type bars necessary to bring the desired letter adjacent the platen. Each impulse is entirely complete in itself and independent of balance of the impulses and so controls the entire mechanism of both the sending and receiving machines that there is a complete cutting out of the electrical current from both the sending and receiving machines with each impulse and if at any point any part of the mechanism should fail to work the operation of the entire mechanism of both the sending and receiving machines is discontinued until the trouble is repaired. In this way there is positive unity of action between both machines which is one of the greatest and most salient features of my invention making it impossible for any message to be improperly transmitted thus avoiding the possibility of any error or interference in the working of the various sending and receiving machines on the line.

This positive action is controlled by impulses, each impulse making and breaking any circuit of both the local and line circuits with each impulse which latter operation and the mechanism therefor is as follows, namely:

When the bar 23 moves under the influence of the lever 144 and moves the type rack, as indicated, a finger member 152 (see Fig. 2) moves into engagement with the spring pressed switch arm 125 and breaks the connection between the points 126 and 124 which breaks the circuit described as moving through these points which depolarizes the coils 111 and 112, releases the contact point 110 from engagement with the coil 112 and breaks the points 134 and 135.

At this time it might be well to call attention to the fact that when the point 110 was contacted with the coil 112 the lip 108a (see Fig. 6) moved away from the leg 99b and against the leg 100b, and broke the line circuit passing through the points 99a and 100a thus making it impossible for any further electrical impulse to pass therethrough as long as the point 110 was in contact with the coil 112 thus rendering it impossible for any interference to be had in the circuit made at that time through the coil 142 as described.

Now when the coil 112 is depolarized the core 108 of course moves to central position again, this being also forced by means of a flexible spring 153 (see Fig. 6) and this forms a connection between the point 99a block 98a and point 100a which would complete the line circuit but the line circuit is by this very action still broken due to the fact that the circuit through the coil 106 is broken releasing the point 105 from engagement with the coil 106 and opening the points 101 and 103 so that no line impulse can affect the action of the parts which will now be described, thus carrying out the positiveness of the action of the machines as indicated above.

With the breaking of the points 124 and 126 the circuit through the coil 142 is broken as is apparent thus depolarizing this coil and releasing the lever 144 whereupon a spring 154 pulls the lever 144 back to normal position (see Fig. 14). When the points 124 and 126 are broken apart they are held in this position by means of a spring pulled bell crank 155 (see Figs. 1 and 2) engaging a dog 156 on the switch arm 125 which bell crank holds such points 124 and 126 apart until the lever 144 is pulled completely back to normal position ready to receive another impulse from the coil 142 thus making it positive that the parts return to normal position before any further electrical impulse can be had through such coil 142. However, when the member 23 is pulled backward by the lever 144 the finger member 157 on said bar 23 engages the other end of the bell crank 155 and releases it from the dog 156 and allows the points 124 and 126 to come together again whereupon another impulse will be imparted through the coil 142 to repeat the operation just described which will advance the type rack the width of another type bar and this action of the parts as indicated above will continue until a sufficient number of impules have been given through the coil 142 to advance the type rack to a point where the desired type bar will be adjacent the platen. This position would be that in which the letter on the type bar would correspond to the key which has been pressed and is controlled and fixed by means of the following structure and operation, namely:

When the key 33 is depressed as described it causes the arm 38 to move forward bringing the adjustment screw 43 into the path of the bar 44 (see Fig. 3). As the shaft 4 is turned by means of the movement of the ratchet wheel just described it rotates the wheel 56 causing the pin teeth 55 to engage the pin teeeth 54 and move the quadrant 53 and incidentally the quadrant 50 in an arc. The movement of the quadrant 50 which engages the quadrant 49 will likewise move the quadrant 49 and move the bar 44 upwardly. When the type bar is positioned in accordance with the key which has been pressed to strike the corresponding letter upon the platen, the bar 44 will come into contact with the screw 43 corresponding to such key by reason of the fact that such screw has been moved into the path of the bar 44 as described. When this is done the hammer 20 is operated to strike the type against the platen and the movement of the type rack is then reversed to return it to normal position all of which is accomplished by means of the following structure, namely:

Upon the bar 44 moving into contact with the screw 43 it presses the arm 38 and incidentally the finger member 39 upwardly bringing it into engagement with the rod 58a and raising the arm 57 to bring the contact points 58 and 59 together. This completes a circuit (see Figs. 1, 2, 3, 4 and 13) from the batteries 116 through the wire 117, wire 118, point 59 to which the wire 118 is connected, point 58, thence through a wire 158 and through a trip coil or eelctromagnet 69, thence through a wire 159 to the wire 132 and thence to the wire 133 and to the battery 116. This polarizes the coil 69 and causes it to attract the plate 68 which action causes the arm 67 to draw the dog 64 against the spring 66 and out of engagement with the arm 75. This releases the arm 75 and the rocking frame 77 and the springs 82 then act to disconnect the point 81 from the point 92 and move the pin 79 to central position. The arm 85 being held in the notch 113, this brings the point 91 so that when the pin 79 is so centered the point 80 will contact with the said point 91 and compel the line circuit to flow in a reverse direction to that described above, namely:

From the battery 94 the circuit is completed through the wire 93, point 91, point 80, pin 79, wire 97, coil 98, wire 99, leg 99b, point 99a, block 98a, point 100a, leg 100b, wire 100, switch 100c, point 101, point 103, wire 104, over the line at the point B back through the ground to the point A and thence through the wire 96 to the battery 94.

This reverse movement of the current causes the polarity coil 98 to polarize the core 108 positively. Since the current through the coils 111 and 112 has been reinstated by the joining of the points 124 and 126 in the manner shown, such coil 111 being a coil having a negative polarity it will attract the positive point 109 and move the core 108 so that the point 134 will contact with a point 160 which will complete a new circuit and incidentally break the line circuit by moving the lip 108a against the leg 100b in a similar manner as previously described for the reverse movement.

Having outlined the new circuit made by connecting the points 134 and 160, it is necessary to describe a previous mechanism and movement which took place when the type rack first commenced to advance under the impetus of the power coil 142. This is as follows, viz., (see Figs. 2, 8 and 13:)

On the opposite side of the type rack to that on which is located the points 138, switch arm 139 and point 140 are similar points 162 and 164 and a similar switch arm 163. The switch arm 163 is normally held to make connection between the points 162 and 164 by means of a spring pulled dog 165 which engages a curving arm 166 pivotally mounted, as at 167. Pivoted in the end of the member 166 is a small spring pressed bell crank 168 which normally projects in the path of a small ball 169 or other similar obstacle mounted in a ring 170 fixed by an arm 171 to the shaft 4. Connected with the switch arm 139 are parts 172, 173, 174, 175 and 177a corresponding to the parts 165, 166, 167, 168 and 177, the bell crank 175 projecting in the path of the member 169 when it moves in the opposite direction to that in which it would engage the member 168.

Referring back to the fact that the shaft 4 by the description hereinbefore set forth moved to the right with its first movement, the member 169 with such movement engages one arm of the member 168. The other arm at this time rigidly engages the member 166 so in order to clear the engaged arm the member 169 moves the member 166 on its pivotal point 167, which action moves against the dog 165 pulling it against its spring 165a and causing the switch arm 163 to describe an arc which will move said switch arm 163 from engagement with the point 164 to engagemnt with the point 176.

When pushed to its outermost position the member 166 is engaged by a spring pressed hook 177 which holds the parts in the last-named position until released in a manner as will be shown. If the type rack is moved to the left a similar action would take place to move the switch arm 139 from engagement with the point 140 into connection with the point 138. It is to be remembered however that when the type rack moves to the right the switch arm 139 and point 140 remain in contact in order to complete the circuit described for operating the coil 142.

Coming back now to the circuit completed when the points 134 and 160 are brought together and remembering that the switch arm 163 has been moved as just described, this circuit is as follows, viz., (see Figs. 1, 2, 3, 8 and 13:)

From the battery 116 through a wire 117, wire 136, point 134, point 160, wire 161, point 162, switch arm 163, point 176, wire 179, point 178, wire 180, to a hammer operating coil or solenoid 181, through any one of three wires 182 to a step switch 183, thence from the step switch to a wire 184 and thence to wire 133 to the battery 116.

The step switch 183 is to control the resistance of the current passing through the hammer operating coil or solenoid 181 to increase or lessen its energy as is desired. When this circuit just described is completed it also completes another circuit which is in multiple with the circuit just described, viz:

From the battery 116, wire 117, wire 136, point 134, point 160, wire 161, point 162, switch arm 163, point 176, wire 179, point 178, wire 185, point 186, point 187 on a switch arm 188, wire 189, escapement coil or solenoid 190, wire 191, wire 132, wire 133, to the battery 116.

By means of the completion of the two last named circuits, the hammer coil or solenoid 181 and the escapement coil 190 are simultaneously magnetized. The magnet of the coil 190 causes such coil to move its core 192 outwardly to act on a bell crank 193, the other arm of the bell crank being connected with a lever 194 which operates the escapement of the machine. This escapement is the same type as that shown in my Patent Number 1151755 and dated August 31, 1915, hence I will not go into any detailed description of the same but merely suffice it to say that with the action of the coil 190 the point 195 is pressed upwardly by the lever 194 and moves the escapement into a position ready to advance same when the point 195 drops downwardly again and not until then.

Simultaneously with the escapement being placed in a position for action the action of the hammer coil or solenoid 181 magnetized by the completion of the circuit as described, moves its core 196 outwardly (note Fig. 3 especially). This core is slotted, as at 196a, into which slot projects the lower end of the hammer lever 19. Thus when the core 196 is driven outward by the action of the coil 181 it moves the said hammer lever 19 on its pivotal point 18 and drives the hammer 20 against the type bar to cause the impression of the type to be made on the paper carried by the platen 3. In addition to the imprinting of the letter with the action of the hammer, the following additional function is performed with the movement of the hammer lever, viz:

Projecting outwardly from the hammer lever 19 is an arm 197 (Figs. 3 and 8) having on its outer end a cam 198 brought adjacent and arranged for engagement with members 177 and 177a. When the hammer lever 19 is moved to draw the hammer against the type bars this arm 197 describes an arc and causes the member 198 to engage the members 177 and 177a. This causes the hook 177 to be released from the member 166 and the spring 165a thereupon pulls these parts back to normal position.

This action disengages the switch arm 163 from the switch arm 176 and breaks the circuit through the escapement coil 190 and hammer coil 181 and demagnetizes them. Thereupon the spring in the escapement forces the pin 195 backward and presses against the lever 194 which in turn presses the bell crank 193 and moves the core 192 back into the coil 190. Also a spring 199 presses the hammer lever 19 back and presses the core 196 back into the coil 181.

Upon the circuit through the coils 190 and 181 being broken by moving the switch arm 163 from the point 176 to the point 164 (remembering that the point 80 is still in engagement with the point 91) a new circuit is completed (see Figs. 1, 2, 3 and 13) and performs a function as follows, viz:

From the battery 116, wire 117, wire 136, point 134, point 160, wire 161, point 162, switch arm 163, point 164, wire 200, a power coil or electromagnet 201, wire 202, wire 133 and to the battery 116.

The completion of this circuit causes the following operation, namely: The coil 201 is polarized. The function of this coil is the same as the function of the coil 142 but for the purpose of moving the type rack in the reverse direction and for the purpose of this function the coil 201 has connected parts 203, 204, 205, 206, 207, 208, 209, and 210 corresponding and acting the same as the parts 144 and 151 and 154 respectively. Thus when the coil 201 is polarized it pulls on the lever 203 which is connected at its upper end to the bar 22 and moves said bar forward to operate the ratchet wheel 21 in the reverse direction to that described above which will return such ratchet bar, shaft 4 and type rack to normal position, this said return being made by impulses in the same manner as the forward motion was induced, the member 22 co-acting with the parts 211, 212, 213, 214 and 130 corresponding to the parts 152, 155, 156, 125 and 157 for the purpose of breaking and making the points 128 and 129 which will make and break the line and local circuits in the manner described for the mechanism on the opposite side of the type rack when said type rack was being advanced forward. This brings the type rack back to normal position by impulses the same as it was advanced and renders this action positive with the same possibility of detecting any error or inoperativeness of either the sending and receiving machines all as fully explained above.

Remembering again that the points 80 and 91 are still in contact, this will keep the circuit so connected that the type rack is completely returned to normal position. When it is so returned to normal position a cam 215 (see Figs. 3 and 8) on the wheel 170 engages a finger member 114a on the lever 114 and moves such lever to release the arm 85 from engagement with the notch 113. The spring 89 will then pull the arm 85 back to normal position and break the points 80 and 91 apart, the said point 79 being held centered by the spring 82. This will permanently break the line circuit and the line circuit being broken this will permanently depolarize the core 108 whereupon the spring 153 will center the same out of engagement with either of the coils 111 or 112 which action will break the operating circuits through the point 134 and render the device inactive.

It is to be understood that as soon as the shaft 4 starts its reverse movement under the action of the bar 22 it so turns the pin teeth 55 that they reverse the action of the quadrant 50 and 49 to carry the bar 40 away from the screw 43 which will allow the points 58 and 59 to be broken.

When the complete action of the machine is over the spring 37 pulls the key 33 back to normal position and the spring 60a pulls the bar 60 and consequently the dog 64 back to normal position. The exact duplicate of the above operation takes place when a key on the right hand side of the machine is pressed and inasmuch as this would only make a surplusage of description I will not enter into a detailed description of how this would be done except to say that the parts on either side of the type rack would act exactly the reverse to that described above and the various circuits would be made directly the reverse of those set forth in the description; that is, the coil 201 would operate the forward movement of the type rack and the coil 142 its reverse movement and the connections through the coils would be made in the reverse direction; but this is readily apparent as it is noted from the drawings that the structure on both sides of the typewriter are exact duplicates the only difference being that the circuits are made to move differently by changing the contact point 134 from engagement with either the point 135 or 160.

It might be well however to call attention to the fact that when the point 79 is moved first to the left instead of to the right as the above description started, it pulls on the hook 88 and moves the arm 86 into engagement with the notch 113b on a spring pressed lever 114b which holds the point 92 ready to be engaged by the point 91 when the pin 79 swings with the reversal of the current, and this engagement is released by the cam 215 engaging the finger member 114c from the said spring pressed lever 114 similarly as the arm 85 is released when the cam 115 engages the finger member 114a.

Attention is called to the fact that when the point 169 is returned to normal position past either the bell cranks 168 or 175 it presses the bell cranks on their pivotal point against their springs to allow of an easy passage and does not act against the member 166 or 173.

I have now described in detail the general mechanism for advancing and reversing the type rack and for operating the hammer mechanism and the escapement mechanism which of course are the essential features of the structure. I have not as yet shown how the type rack may be shifted to bring the lower row of numerals and characters in position to be engaged by the hammer to drive the same against the platen, nor have I described how the carriage is returned and the platen rotated, nor how spacing between the words or figures is made. All of these involve certain distinct structure and will therefore be taken up in their order.

Describing first the shifting mechanism for the type rack, attention is called to the above description wherein I stated that there was a gap between the type bars, as at 15, the space being in length equal to the width of four type bars. It is while the type rack is moving through any portion of this space that the various operations indicated above are carried out.

Figure 8:
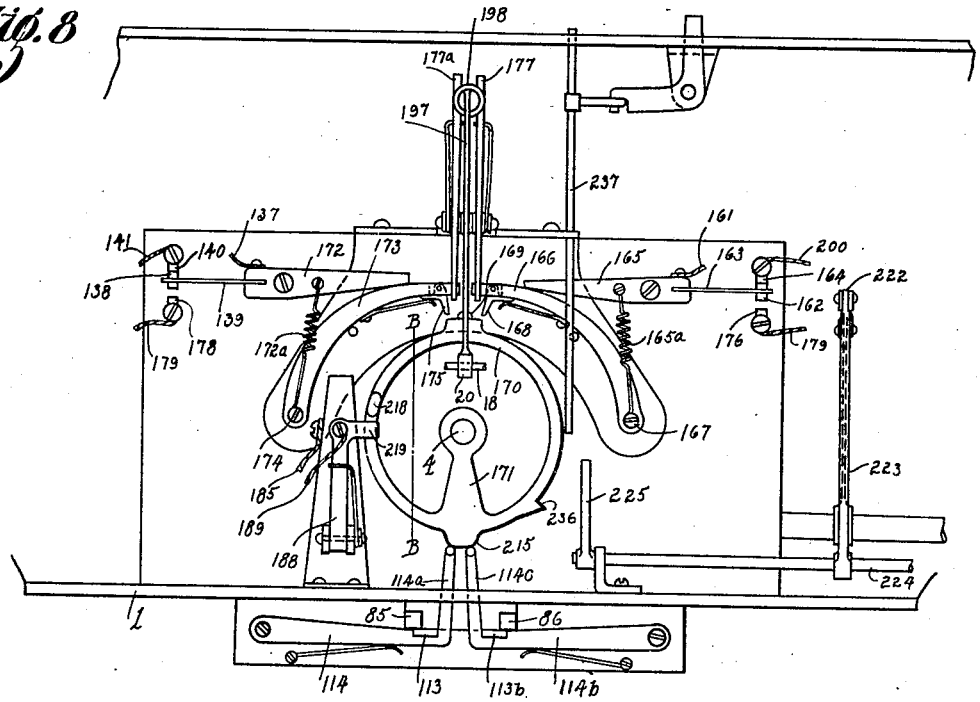
Fig. 8 is a plan view of the mechanism for controlling the "get-ready" mechanism for the hammer operating circuit and showing also certain other control means as will appear.
Figure 9:
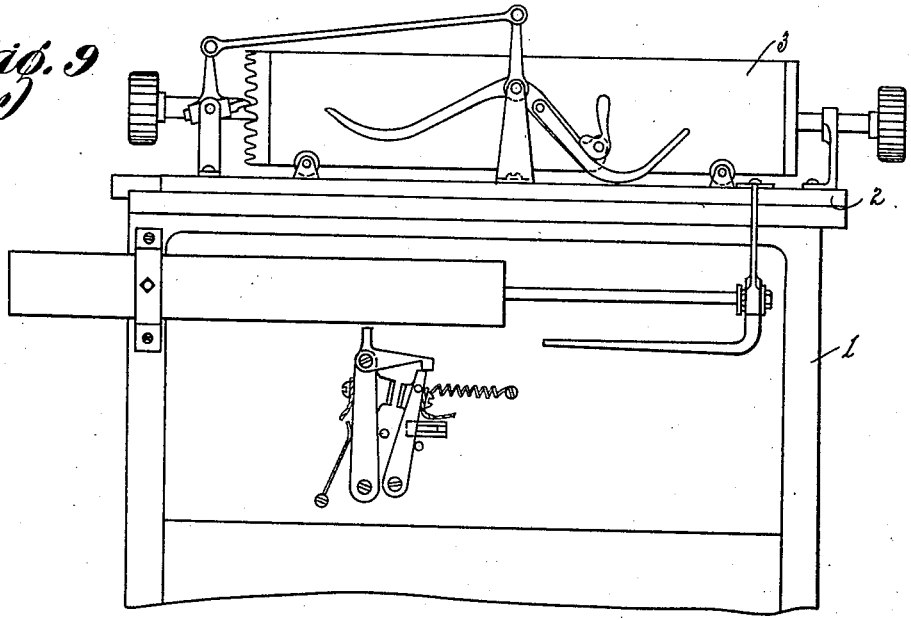
Fig. 9 is a rear elevation showing the carriage return mechanism.
Figure 12:
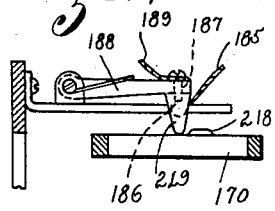
Fig. 12 is a sectional view taken on a line B—B of Fig. 8.
Figure 10:
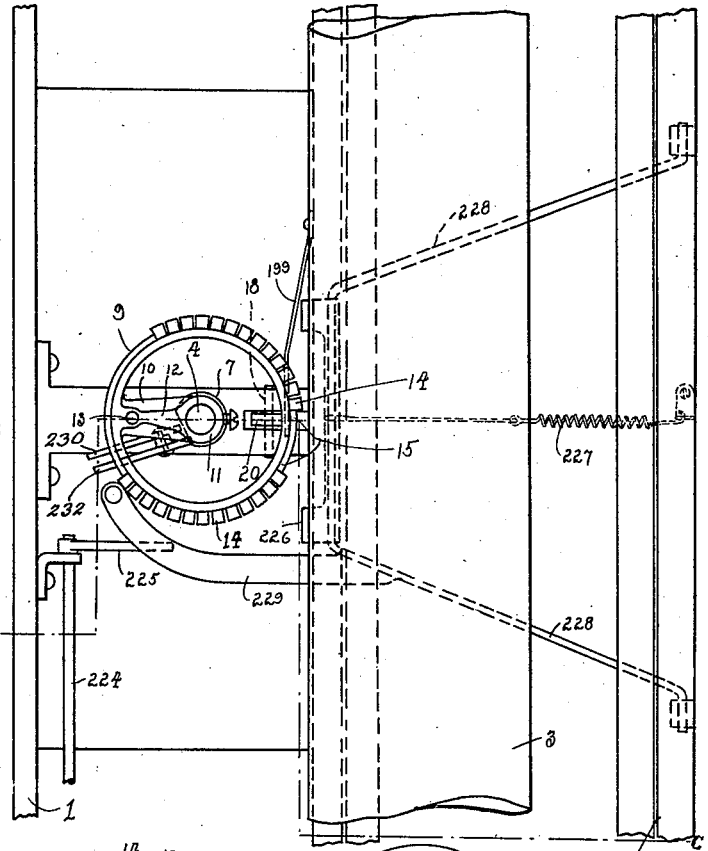
Fig. 10 is a top plan view of the type rack.

Describing the spacing operation (see Figs. 1 and 10) when it is desired to merely make a space without striking a letter the spacing or escapement key 216 will be so adjusted with one of the set screws 43 that it will allow a movement of the type rack equal only to the width of one type bar. When this key is depressed it will throw the entire mechanism described into operation and give one impulse to the type rack which will move the type rack, as indicated, the width of one type bar, but since the space 15 is equal to the width of four type bars there will be no type bar adjacent the platen so that when the hammer 20 operates it will not make an impression on the paper on the platen 3. With the operation of such hammer however the escapement will operate to advance the platen 3 in the manner indicated and this will make the desired spacing between the letters on the paper carried by such platen 3 and upon such space being made the parts will all return to normal position again in the manner specified.

Assuming now that the type rack is to be shifted upwardly in order to bring the row of numerals or characters adjacent the platen, and it is likewise desired to lift the ribbon a corresponding distance, this is accomplished as follows, (see Figs. 1, 3, 8 and 12:)

The operator strikes the shift key 217; this key is so adjusted that it will allow of two impulses to be directed against the type rack which will move the rack a distance equal to the width of two type bars and as is apparent with the width of the space 15 this will not bring any type bar adjacent the platen. When two spaces are moved a lug 218 on the wheel 170 engages a cam 219 on the switch arm 188 and lifts such switch arm so as to break the points 186 and 187 apart and thus disconnect the circuit through the escapement coil 190. Then again when the hammer mechanism operates it will act independently and there will be no escapement movement nor will there be any impression given against the paper on the platen but the following action will take place, viz., (see Figs. 1, 3, 8, 10 and 11:)

When the core 196 is moved outwardly it will press against a lever 220 having a crank arm 221 which will push upwardly against the rod 222 which will likewise move upwardly an arm 223 which will turn a shaft 224, the movement of which shaft causes an arm 225 to describe an arc upwardly. The ribbon guides 226 are provided with stabilizing spring 227 and pivoted in swinging arms 228. On these arms 228 is a projecting arm 229 normally extending over the arm 225 and being arranged for alinement with a rigid finger member 230 secured to the underside of the type rack 9. The arm 229 has an adjustment screw 229a to adjust the exact position at which it will come into contact with the finger member 230 as will hereinafter appear. Pivoted on the finger member 230 is a spring pressed bell crank 232. The normal spacing between the finger member 230 and the bell crank 232 is equal to the width of one type bar for a purpose as will presently appear. When the type rack 9 has moved around a distance equal to the space of two type bars it brings the finger member 230 into alinement with the screw 229a. Then when the arm 225 arcs upwardly it engages the arm 229 and brings the screw 229a into engagement with the finger member 230 and lifts the type rack 9 until the type 17 is adjacent the hammer 20.

When this happens a spring 233 on the bell crank 232 moves one arm of the bell crank into engagement with the collar 7 which action holds the type rack in its lifted position until released as will appear. Then with subsequent operations of the keys of the type impressions will be taken off of the type 17 instead of from the type 16. The points 186 and 187 are of course only broken just while this shifting operation is going on so that there will be no spacing done but with the remaining number of impulses which might be imparted to the type rack these points will be together as is apparent.

When it is desired to again drop the type rack so that the type 16 will be adjacent the hammer 20 the type key 234 is pressed which key is so adjusted that three impulses will be given to the type rack. These three impulses of the type rack will bring the finger member 230 so that it will clear the screw 229a which will bring the bell crank 232 in such position that it will be engaged by the arm 229 so that when said arm 229 is raised it will engage the bell crank and release it from engagement with the collar 7 which will allow the type rack to drop down into its lower position again. With every operation of the hammer 20 the arm 229 will of course be raised and will raise the ribbon guide 226 to be present opposite the type bars but the shifting of the type rack will only be accomplished when the members 230 and 232 are brought in alinement with the members 229 and 229a by the two or three impulses indicated.

In order to return the carriage the carriage return key 235 is pressed. This key is adjusted to impart a sufficient number of impulses to the type rack to bring the wheel 170 into that position in which a cam 236 will engage a rod 237 which will operate the automatic carriage return which is very similar to that shown in my Patent Number 1151756 and dated August 31st, 1915, hence no detailed description of the same will here be entered into. This carriage return will likewise turn the platen in the method set forth in said patent or in any other form found desirable and adaptable.

The main line wire is connected by a wire 237a with a shunt switch 238 so that the respective machines may be thrown in or out of action as desired.

From the foregoing description it will readily be seen that I have produced such a device as substantially fulfils the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A telegraphic typewriter comprising a type rack, a local battery for operating the type rack, a line battery for controlling the action of the local battery, means for making and breaking the circuit through the local battery with the action of the type rack, and means for likewise making and breaking the circuit through the line battery each time the circuit through the local battery is broken.

2. A telegraphic typewriter comprising a local battery for operating the typewriter, a line battery for controlling the action of the local battery, means operable by the action of the keys of the typewriter for throwing the line battery into action whereby the local battery will act to operate the typewriter, such action being performed in impulses, the circuit of the local battery being broken between each impulse, and means whereby with each impulse of the local battery the circuit through the line battery will likewise be broken.

3. The combination with a typewriter having a rotary type rack, of a local battery arranged to rotate the type rack in a step by step motion, means whereby the circuit through the local battery will be made and broken with each step, a line battery for controlling the action of the local battery, and means whereby the circuit through the line battery will be broken with each break in the circuit of the local battery.

4. The combination with a typewriter having a rotary type rack, of a reciprocating member arranged to advance the type rack in a step by step motion, a local battery for operating the reciprocating member, means for making and breaking the circuit through the local battery with each movement of the reciprocating member, a line battery controlling the action of the local battery, and means whereby the circuit through the line battery will be broken each time the circuit through the local battery is broken.

5. A telegraphic typewriter including the combination with a rotary type rack, of a ratchet wheel fixed to the rack, of a pair of V-shaped retaining members, a means engageable with the ratchet wheel for moving the same for a portion of a predetermined distance and co-incidentally therewith moving one retaining member into complete engagement with one of the ratchets and moving the other retaining member out of engagement with the ratchets, the movement of the ratchet wheel being such as to move the ratchet next adjacent the one from which the latter retaining member is removed just past the center line of such retaining member, such latter retaining member having means whereby when the first named retaining member is removed from engagement with the ratchet wheel the second named retaining member will move completely into said adjacent ratchet and complete the movement of the wheel.

6. In a telegraphic typewriter having a line battery and a local battery, the line battery controlling the operation of the local battery, of a means for making and breaking the connections with the local battery, such means comprising a pair of electromagnets in the local battery circuit disposed in spaced relation, a polarity coil in the line battery circuit having its core projecting between the electromagnets, and a contact point on the core for making or breaking connections with the contact points in the local circuit, the line battery being reversible for the purpose of causing the polarity coil to change the polarity of its core whereby it will be attracted by one or the other of the electromagnets to cause a connection to be made through one or the other of the local circuits by bringing the contact point on the core of the polarity coil into engagement with one or the other of the contact points in the local circuit.

7. A telegraphic typewriter including the combination with a rotary type rack, of a means for imparting step by step motion to the rack, such means comprising a reciprocating arm arranged to move into driving relation with the rack when moving in one direction, means for electrically operating the arm into such driving relation with the rack, means for breaking the circuit through said electrical operating means with each movement of the arm, a means for pulling the arm out of driving relation with the rack each time the circuit is broken, and means for closing the circuit by such latter action.

8. A telegraphic typewriter including the combination with a rotary type rack, of a means for imparting step by step motion to the rack, such means comprising a reciprocating arm arranged to move in driving relation with the rack with its movement in one direction, electrical means for moving the arm in the latter direction, means for pulling the arm out of driving relation with such rack when the circuit through the electrical means is broken, and means for breaking and closing such circuit with each complete movement of the arm, such means including a fixed contact point, a spring pressed arm carrying another contact point for engagement with the fixed point, such rack being provided with a cam, a spring pulled bell crank having one arm engaging the spring pressed arm, a pair of finger members on the reciprocating arm, one arranged to engage the swinging arm when the dog is in driving relation with the rack to break the circuit, the bell crank then engaging the cam on the swinging arm to hold the circuit broken, the other finger being arranged to engage the opposite end of the bell crank with the returning movement of the reciprocating arm to release the bell crank from the cam and allow the points to come together again.

9. The combination with an electrically controlled typewriter, of a means for closing and opening the circuit, such means comprising a pair of points, a rocking frame, a pin on the frame, one of said points being mounted on the pin and normally held spaced from the farther point to hold the circuit open, means operable by the depression of a key of the typewriter for rocking the frame to bring the points together to close the circuit, such means including a finger member engageable by the key to move it into engagement with the rocking frame, means for withdrawing the finger member from such engagement to allow the circuit to be broken, such means including a coil, means for energizing the coil when the circuit is to be broken, the coil when energized, active to attract the finger member and withdraw it from engagement with the rocking frame.

10. The combination with a typewriter having electrically controlled hammer mechanism, of a means for closing and breaking the circuit thereof, such means including a pair of points normally spaced apart to break the circuit, a type rack, means operable by the movement of the rack to move the points together to close the circuit, such means including a swinging bar on which one point is mounted, and a gear mechanism interposed between the rack and bar to impart movement to the latter with the movement of the rack.

11. In a telegraphic typewriter, the combination with a rotary type rack, a hammer mechanism including an electrical operating circuit for the same having a normal gap comprising two spaced points, and means for closing the gap with the movement of the rack, such means including a shaft on the rack, a gear on the shaft, a quadrant having a gear meshing with the gear on the shaft, a swinging arm, a gear on the arm, another gear on the quadrant meshing with the gear on the arm, the swinging arm being operable to move the points together, when actuated by said gearing.

12. A telegraphic typewriter comprising a keyboard and rotary type rack, hammer and escapement movements, an electrical circuit for operating each movement, the first of said circuits being made upon the depressing of a key whereby the type rack is turned a predetermined distance, means dependent upon said rack movement for setting the hammer circuit in position for closing as the rack moves, means whereby the hammer and escapement movement circuits are closed when the rack reaches the limit of its movement, and means whereby the rack is turned back to its starting point and the circuits broken upon completion of the hammer and escapement movements.

13. A telegraphic typewriter including a rotary type rack, a local electrical circuit for operating the rack, a line electrical circuit controlling the local circuit, means for closing the line circuit making the current flow in one direction to cause the local circuit to move the rack in one direction, means for reversing the flow of current of the line circuit to reverse the local circuit and move the rack in the opposite direction, a hammer circuit and an escapement circuit and means for closing the latter circuit upon the reversal of the line circuit.

In testimony whereof I affix my signature.

ORIN BENNETT.

Copies of this patent may be obtained for five cents each, by addressing the "Commissioner of Patents, Washington, D. C."